United States Patent
Sasaki et al.

(10) Patent No.: US 10,151,268 B2
(45) Date of Patent: Dec. 11, 2018

(54) METHOD FOR MANUFACTURING PISTON FOR INTERNAL COMBUSTION ENGINE, AND PISTON FOR INTERNAL COMBUSTION ENGINE

(71) Applicant: Hitachi Automotive Systems, Ltd., Hitachinaka-shi, Ibaraki (JP)

(72) Inventors: Masato Sasaki, Sagamihara (JP); Norikazu Takahashi, Yokohama (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 402 days.

(21) Appl. No.: 14/905,175

(22) PCT Filed: Jul. 24, 2014

(86) PCT No.: PCT/JP2014/069519
§ 371 (c)(1),
(2) Date: Jan. 14, 2016

(87) PCT Pub. No.: WO2015/016122
PCT Pub. Date: Feb. 5, 2015

(65) Prior Publication Data
US 2016/0177864 A1    Jun. 23, 2016

(30) Foreign Application Priority Data
Aug. 1, 2013 (JP) ................. 2013-160029

(51) Int. Cl.
*B23K 20/12* (2006.01)
*F02F 3/14* (2006.01)
(Continued)

(52) U.S. Cl.
CPC ............. *F02F 3/14* (2013.01); *B22F 7/062* (2013.01); *B23K 20/128* (2013.01);
(Continued)

(58) Field of Classification Search
CPC ...... F02F 3/14; F02F 3/003; F02F 3/00; F02F 3/26; C21D 9/0068; B22F 7/062;
(Continued)

(56) References Cited

U.S. PATENT DOCUMENTS

2003/0150418 A1    8/2003    Barnes

FOREIGN PATENT DOCUMENTS

| JP | 64-71631 A | 3/1989 |
|----|------------|--------|
| JP | 11-193721 A | 7/1999 |

(Continued)

OTHER PUBLICATIONS

Japanese- Language Office Action issued in counterpart Japanese Application No. 2015-529537 dated May 24, 2016 (4 pages).
(Continued)

*Primary Examiner* — Ryan J Walters
(74) *Attorney, Agent, or Firm* — Crowell & Moring LLP

(57) ABSTRACT

Concave part is formed in a crown surface of the top of piston made of an aluminum alloy. This concave part is filled with mixed powder constituted of zirconia powder as a filler material and pure aluminum powder as a bonding material. Solid cylindrical rotary implement is brought into contact with concave part filled with mixed powder, and then pressed against piston under load while being rotated. Mixed powder is softened by frictional heat with rotary implement, whereby mixed powder is bound in a solid phase to concave part to form low thermal conductive part. With this, the bonding strength of low thermal conductive part to the crown surface of the top of the piston is improved.

14 Claims, 12 Drawing Sheets

(51) Int. Cl.
*F02F 3/00* (2006.01)
*F02F 3/26* (2006.01)
*F16J 1/01* (2006.01)
*B22F 7/06* (2006.01)
*C21D 9/00* (2006.01)
*C22F 1/00* (2006.01)
*B23K 101/00* (2006.01)

(52) U.S. Cl.
CPC ........ *B23K 20/1215* (2013.01); *C21D 9/0068* (2013.01); *C22F 1/00* (2013.01); *F02F 3/00* (2013.01); *F02F 3/003* (2013.01); *F02F 3/26* (2013.01); *F16J 1/01* (2013.01); *B23K 2201/003* (2013.01)

(58) Field of Classification Search
CPC ........... C22F 1/00; F16J 1/01; B23K 20/1215; B23K 2201/003; B23K 20/128
See application file for complete search history.

(56) References Cited

FOREIGN PATENT DOCUMENTS

| | | |
|---|---|---|
| JP | 2004-502071 A | 1/2004 |
| JP | 2005-76471 A | 3/2005 |
| JP | 2005-272919 A | 10/2005 |
| JP | 2007-100129 A | 4/2007 |
| JP | 2008-175163 A | 7/2008 |
| JP | 2012-47110 A | 3/2012 |

OTHER PUBLICATIONS

International Search Report (PCT/ISA/210) issued in PCT Application No. PCT/JP2014/069519 dated Sep. 30, 2014 with English translation (Four (4) pages).
Written Opinion (PCT/ISA/237) issued in PCT Application No. PCT/JP2014/069519 dated Sep. 30, 2014 (Four (4) pages).

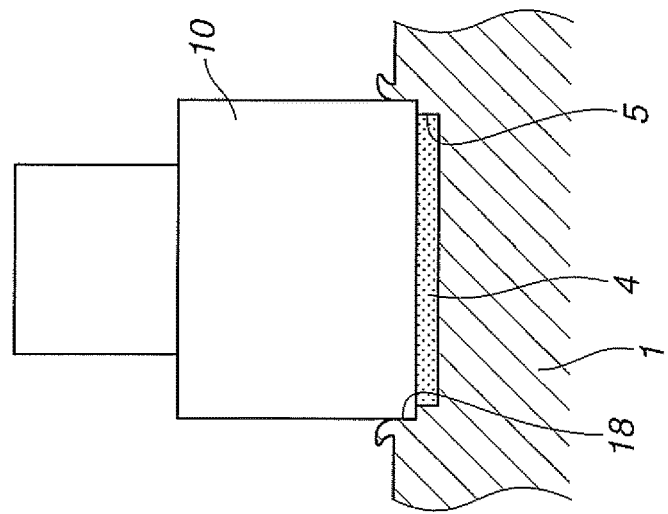
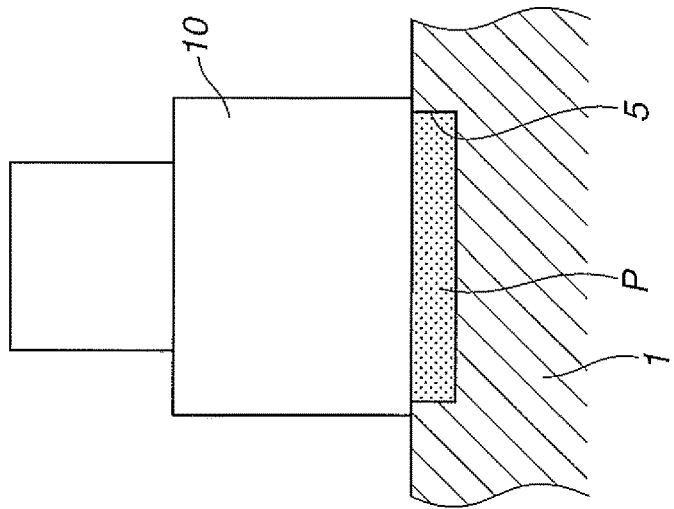
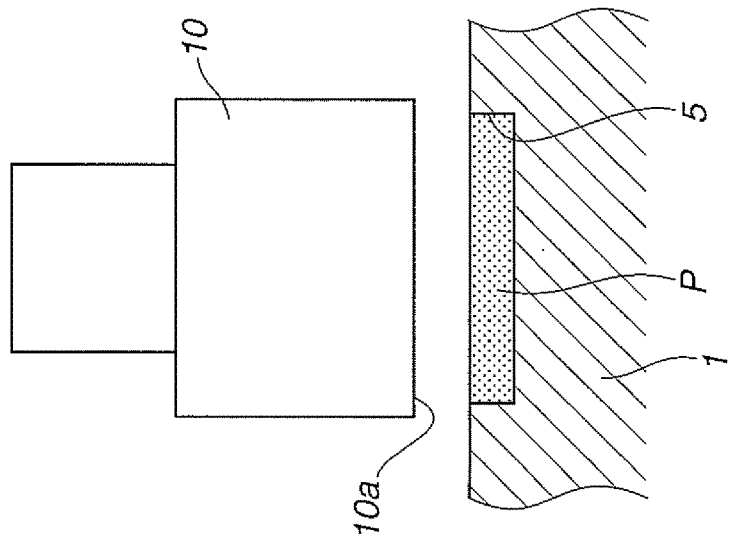

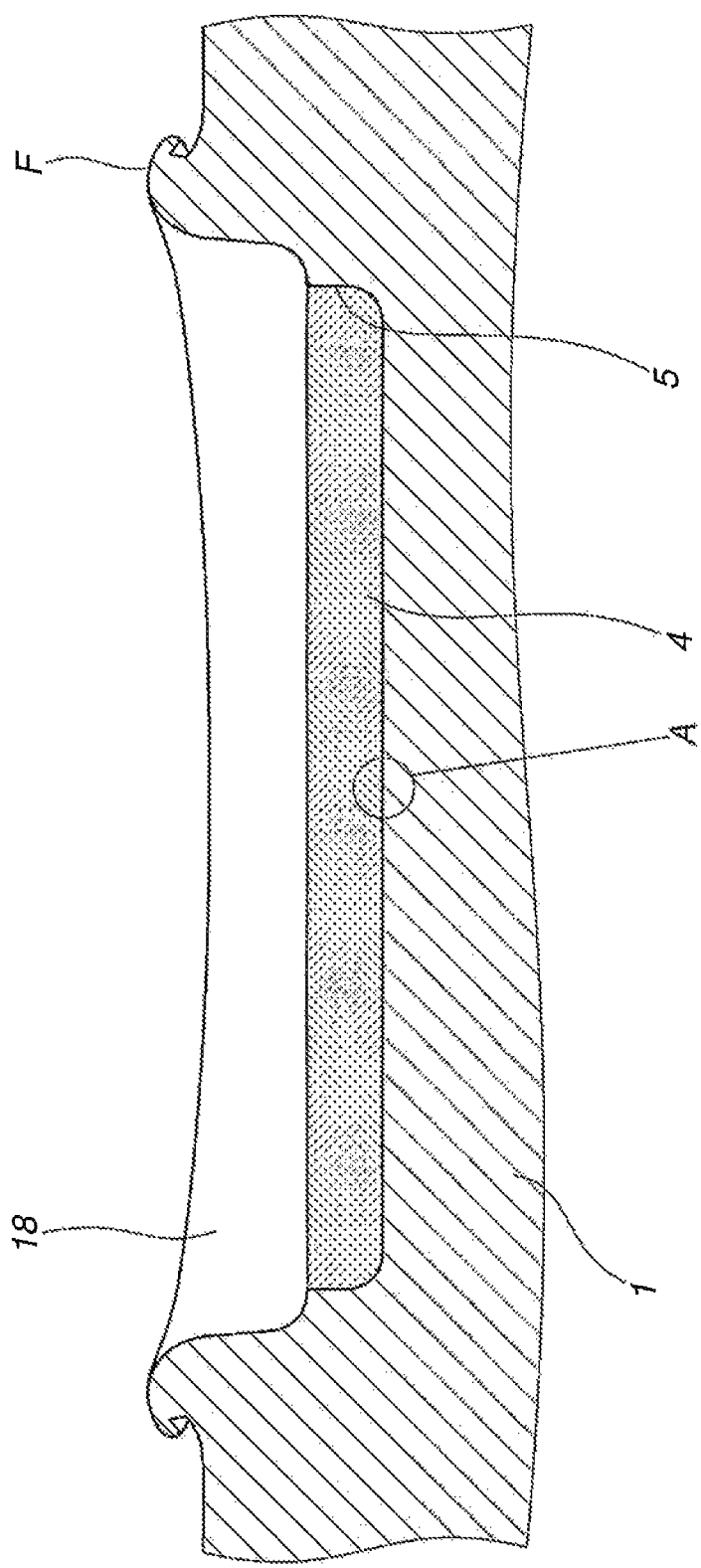

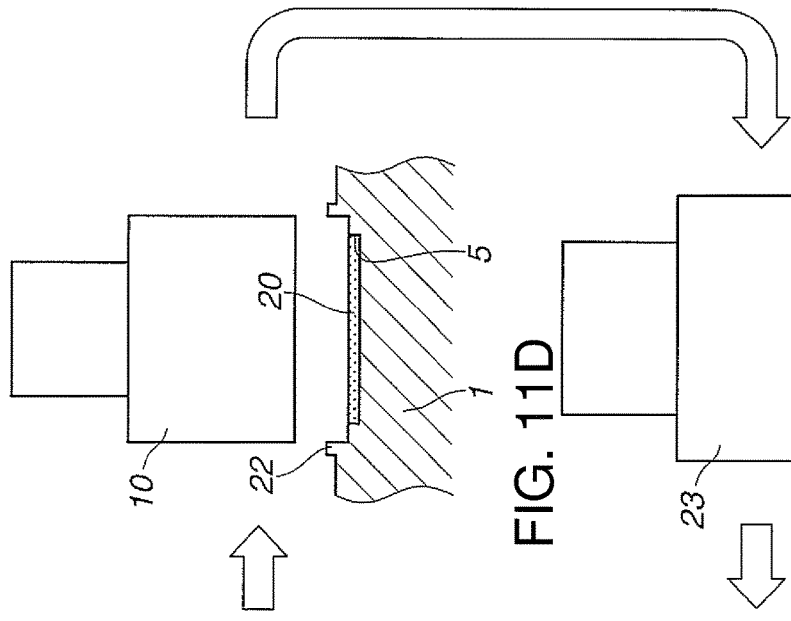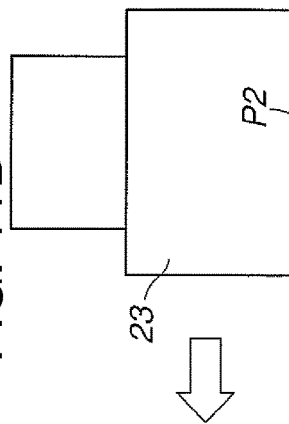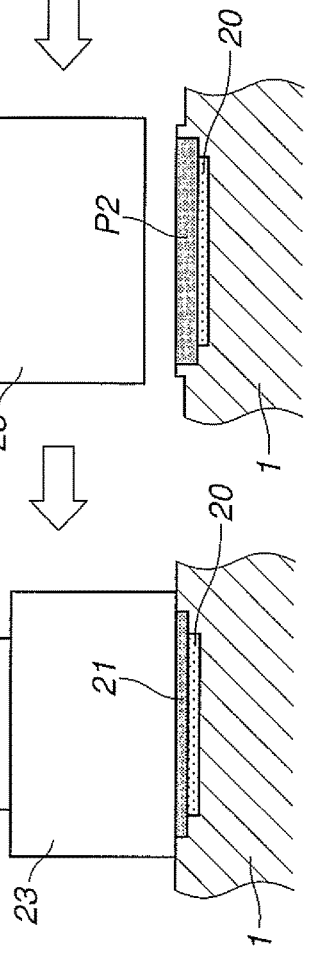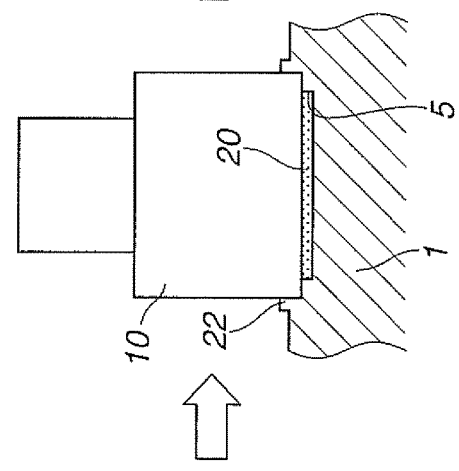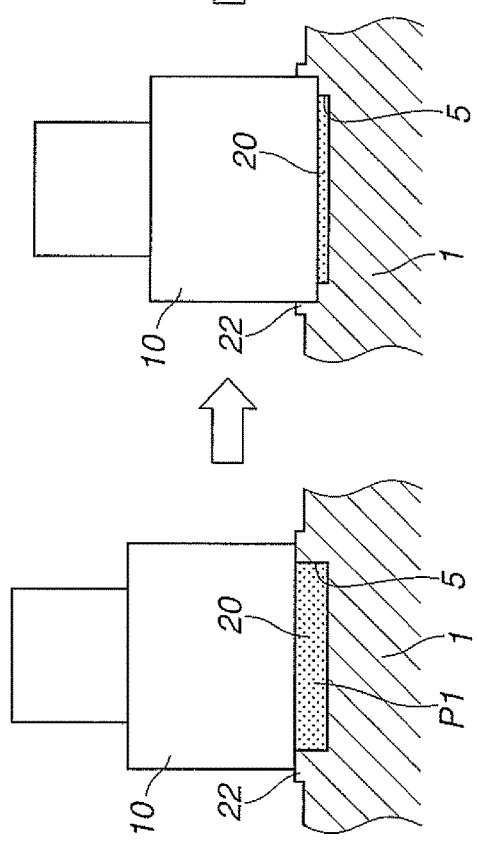

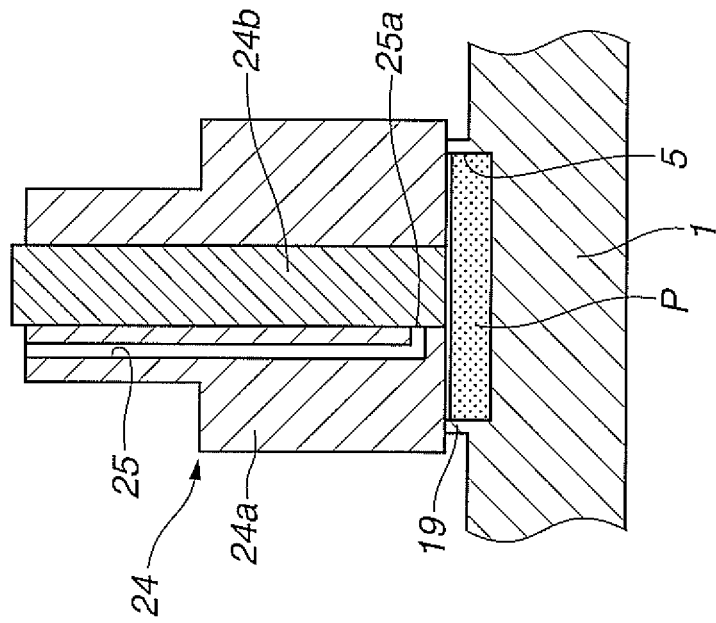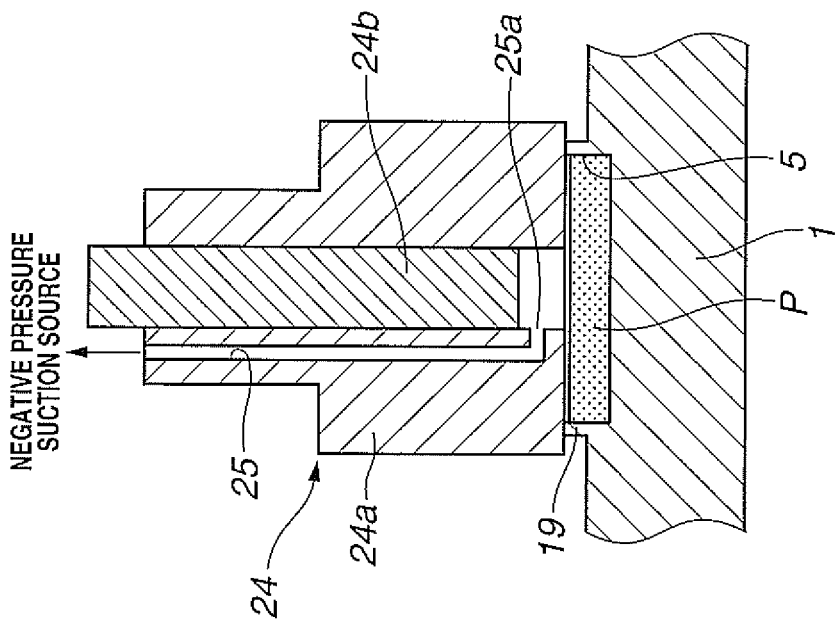

METHOD FOR MANUFACTURING PISTON FOR INTERNAL COMBUSTION ENGINE, AND PISTON FOR INTERNAL COMBUSTION ENGINE

TECHNICAL FIELD

The present invention relates to a method for manufacturing a piston for internal combustion engine, and to a piston for internal combustion engine.

BACKGROUND OF THE INVENTION

As a conventional example of a piston for internal combustion engine, one discussed in Patent Publication 1 has been known. In Patent Publication 1 assuming that the piston is one used in a direct injection type spark-ignition internal combustion engine to be ignited by injecting the fuel from a fuel injection valve toward the top of a piston, the piston is provided to have at a part of its top surface a fuel impingement portion where the fuel impinges in the form of fluid, and the area including the main combustion zone is composed of a member or structure having low thermal conductivity and low specific heat, If adopting this piston structure, it becomes possible to suppress depositing and exhaust of smoke by improving temperature rise efficiency at the fuel impingement portion to accelerate evaporation of the fuel that impinges against the piston thereby decreasing adhesion of the fuel to the top of the piston.

In the technique described in Patent Publication 1, there is a description that a low thermal conductive member having low thermal conductivity is attached to the top of the piston; however, a concrete method or means for attaching the low thermal conductive member is not discussed at all. Consequently, there has been apprehension about a bond between the low thermal conductive member and the base material of the piston, i.e., a poor bonding strength and a poor reliability.

REFERENCES ABOUT PRIOR ART

Patent Documents

Patent Publication 1: Japanese Patent Application Publication No. 11-193721

SUMMARY OF THE INVENTION

The present invention has originated in view of the above problems, the object of which is to improve the bonding strength between the top of a piston and a low thermal conductive member provided thereon.

In the present invention, a piston is provided to have a concave part at its crown surface. The concave part is filled with: a mixed powder obtained by mixing powder of a filler material having a thermal conductivity lower than that of the base material of the piston and powder of a bonding material which may become an alloy or an intermetallic compound when blending with the base material of the piston; or a compacted body of the mixed powder. The mixed powder, or the compact of the mixed powder is bound in a solid phase to the concave part in a manner similar to the so-called friction stir welding, thereby forming a low thermal conductive part.

According to the present invention, the bonding strength of the low thermal conductive part against the base material of the piston is increased, so that the bonding quality and the reliability are enhanced.

BRIEF DESCRIPTION OF THE DRAWINGS

FIGS. 4A and 4B are a view showing the details of an essential part of FIG. 3, wherein FIG. 4A is an explanatory front view and FIG. 4B is an explanatory plan view of the figure FIG. 4A.

FIGS. 5A-5C are a view showing a first embodiment of the present invention, or a process-explaining view showing the details of friction bonding as shown in FIG. 2.

FIG. 6 is an enlarged sectional view of a low thermal conductive part formed by the friction bonding of FIG. 5.

FIGS. 11A-11E are a view showing a fourth embodiment of the present invention, or a process-explaining view showing the details of the friction bonding step.

FIGS. 12A and 12B are a view showing a fifth embodiment of the present invention, or a process-explaining view showing the details of the friction bonding step.

MODE(S) FOR CARRYING OUT THE INVENTION

Figure 1:
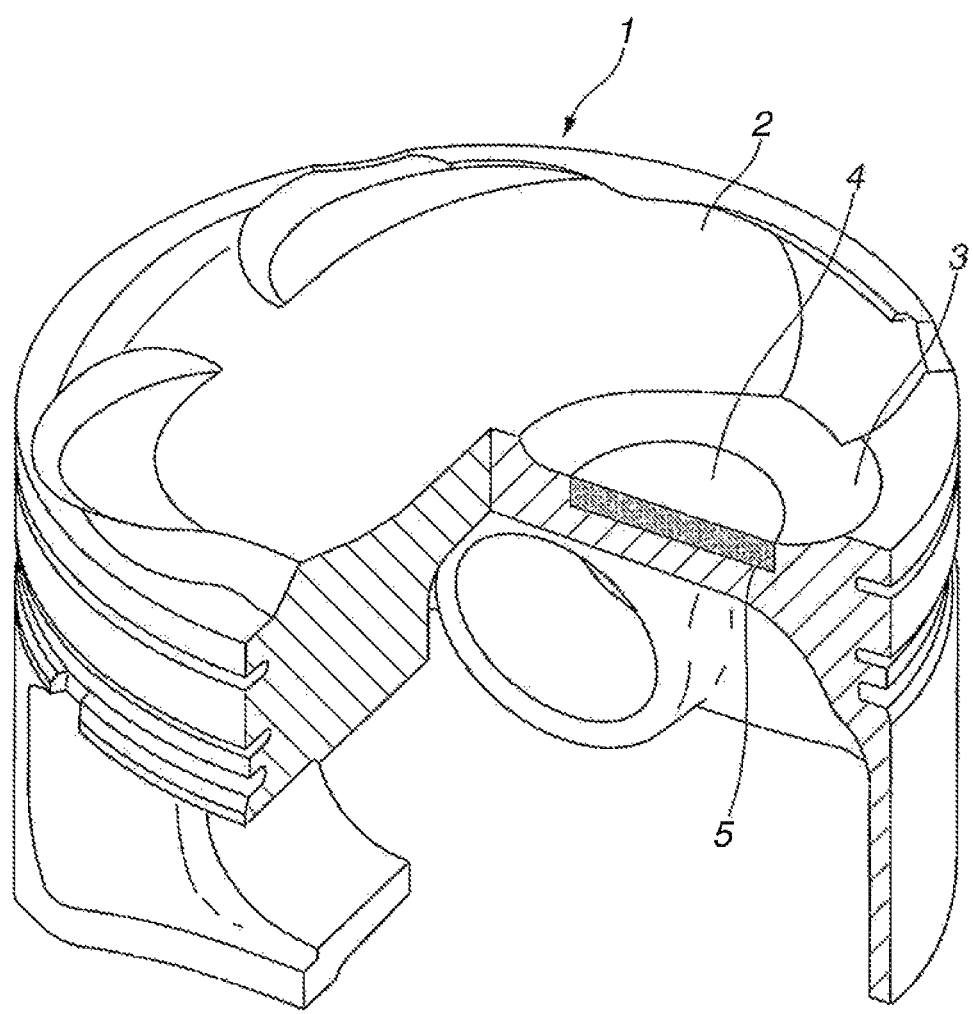
FIG. 1 is a view showing an example of a piston manufactured according to the present invention, or a view explaining a structure with part broken.

FIGS. 1 to 7 illustrate a more concrete embodiment of the present invention. In particular, FIG. 1 shows a structure of a piston in itself used in a direct injection type spark-ignition internal combustion engine.

Piston 1 as illustrated in FIG. 1 is provided to have a relatively shallow circular depression 3 in crown surface 2 serving as the top of the piston formed of an aluminum alloy etc. as a base material, at a position where the fuel injected from a fuel injection valve (not shown) impinges. About the center of depression 3, there is provided circular low thermal conductive part 4 characterized by being lower than the base material in thermal conductivity thereby exhibiting an insulating effect.

As will be mentioned later, the low thermal conductive part 4 is formed in such a manner as to: previously form a closed-end circular concave part 5 smaller than the depression 3 in diameter smaller than about the center of depression 3; fill concave part 5 with a certain mixed powder; and then cause solid-state bonding (or diffusion bonding) against concave part 5 by a technique similar to the so-called friction stir welding.

The above-mentioned certain mixed powder is conditioned to become lower than the aluminum alloy serving as the base material of piston 1 in thermal conductivity at the time of changing into low thermal conductive part 4 by the solid-state bonding. For example, it is possible to adopt a mixed powder obtained by mixing a filler material powder smaller than the base material of piston 1 (e.g. an aluminum alloy) in thermal conductivity such as a powder of solid ceramic materials including zirconia ($ZrO_2$), cordierite, mullite, silicon, silica (e.g. silicon dioxide $SiO_2$), mica, talc and alumina-based or silicon nitride-based materials and a powder of glass including silicate glass, acrylic glass, organic glass and the like with a bonding material powder which may become an alloy or an intermetallic compound when blending with the base material of piston 1 such as powder of an aluminum alloy.

The above-mentioned filler material powder and the bonding material powder may be in the form of flakes or chips. Additionally, the filler material powder is not limited to the above-mentioned examples. For instance, it is possible to employ hollow ceramic beads, hollow glass beads or hollow metal balls as the filler material powder, in addition to finely porous-structured filler materials containing silica as the primary component such as silica gel and silica aerogel. Moreover, it is also possible to adopt a powder of organic silicon compound containing carbon, oxygen, silicon and the like, ceramic fiber with high strength and high heat resistance, and heat resistant metal materials having low thermal conductivity and low specific heat such as titanium, titanium alloy, SUS, low-alloy steel and cast iron (e.g. gray iron and ductile cast iron).

When charging the above-mentioned mixed powder into concave part 5, it may be used in the original form of powder. Alternatively, the mixed powder may be a predetermined compacted body e.g. a green compact obtained in such a manner as to subject the mixed powder to preforming by pressurizing the mixed powder in advance into a biscuit-like shape. The green compact may be fitted or dropped into concave part 5.

Figure 2:
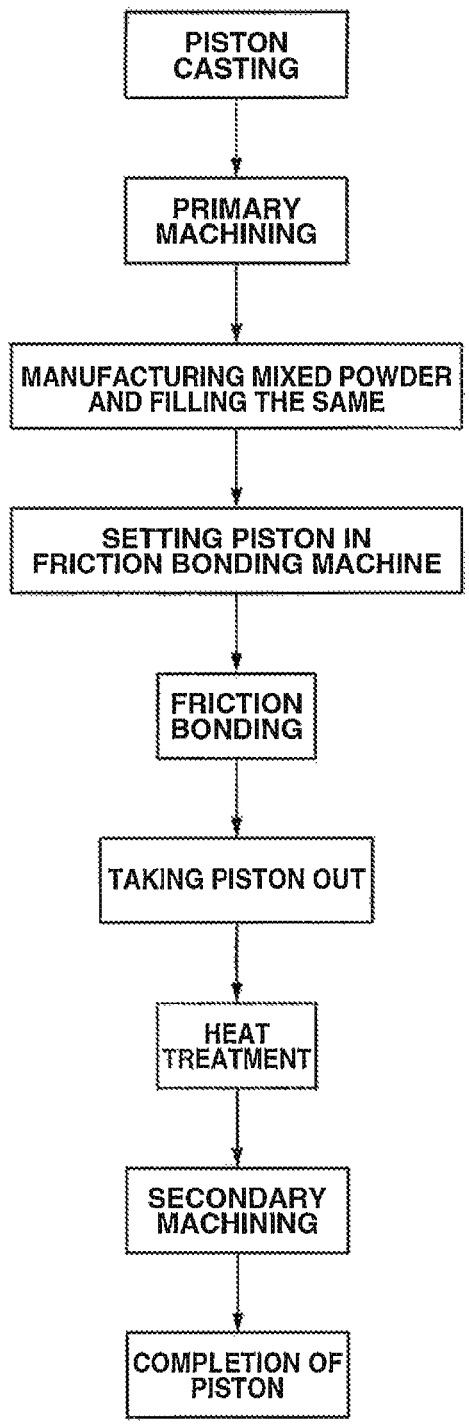
FIG. 2 is a process-explaining view showing the outline of a process for manufacturing the piston as shown in FIG. 1.

FIG. 2 shows a sequence of procedures for producing piston 1, involving filling of the mixed powder and friction bonding. In a step of casting a piston as shown in this chart, a raw material of piston 1, formed of an aluminum alloy, is casted by a publicly known method. Subsequently, in a primary machining step, a predetermined machining is conducted as a primary machining in such a manner as to include external diameter cutting of a land section of a raw material of piston 1 and pinhole drilling. Incidentally, it is important to previously carry out external diameter cutting of a land section and pinhole drilling as the primary machining, for enhancing positioning accuracy at the time of setting piston 1 in the undermentioned friction bonding machine. Furthermore, concave part 5 in crown surface 2, as shown in FIG. 1 may be formed at the time of casting by the so-called coring method, or it may be formed simultaneously at the time of the primary machining. In either case, this step corresponds to a concave part-forming step.

In a step of manufacturing a mixed powder and filling the same, the above-mentioned filler material powder and bonding material powder are mixed thereby producing a mixed powder, followed by filling it into concave part 5 of piston 1. In this case, it is also possible to produce a green compact from the mixed powder in advance and then fit or drop it into concave part 5, as mentioned above. This step corresponds to a step of filling material into concave part 5.

Then, piston 1 where concave part 5 is charged with the mixed powder as discussed above is set in a friction bonding machine while determining its location, followed by performing friction bonding. This step corresponds to a friction bonding step, the details of which will be discussed below.

When completing friction bonding, piston 1 is taken out of the friction bonding machine, followed by performing heat treatment as a post-treatment. This heat treatment aims to remove distortions caused together with plastic deformation in friction bonding and uniformalize the strength, so that it is carried out as a solution aging treatment or artificial aging treatment.

When thus accomplishing heat treatment of piston 1, finishing cutting is conducted as a secondary machining, thereby completing piston 1 as a final product.

Figure 3:
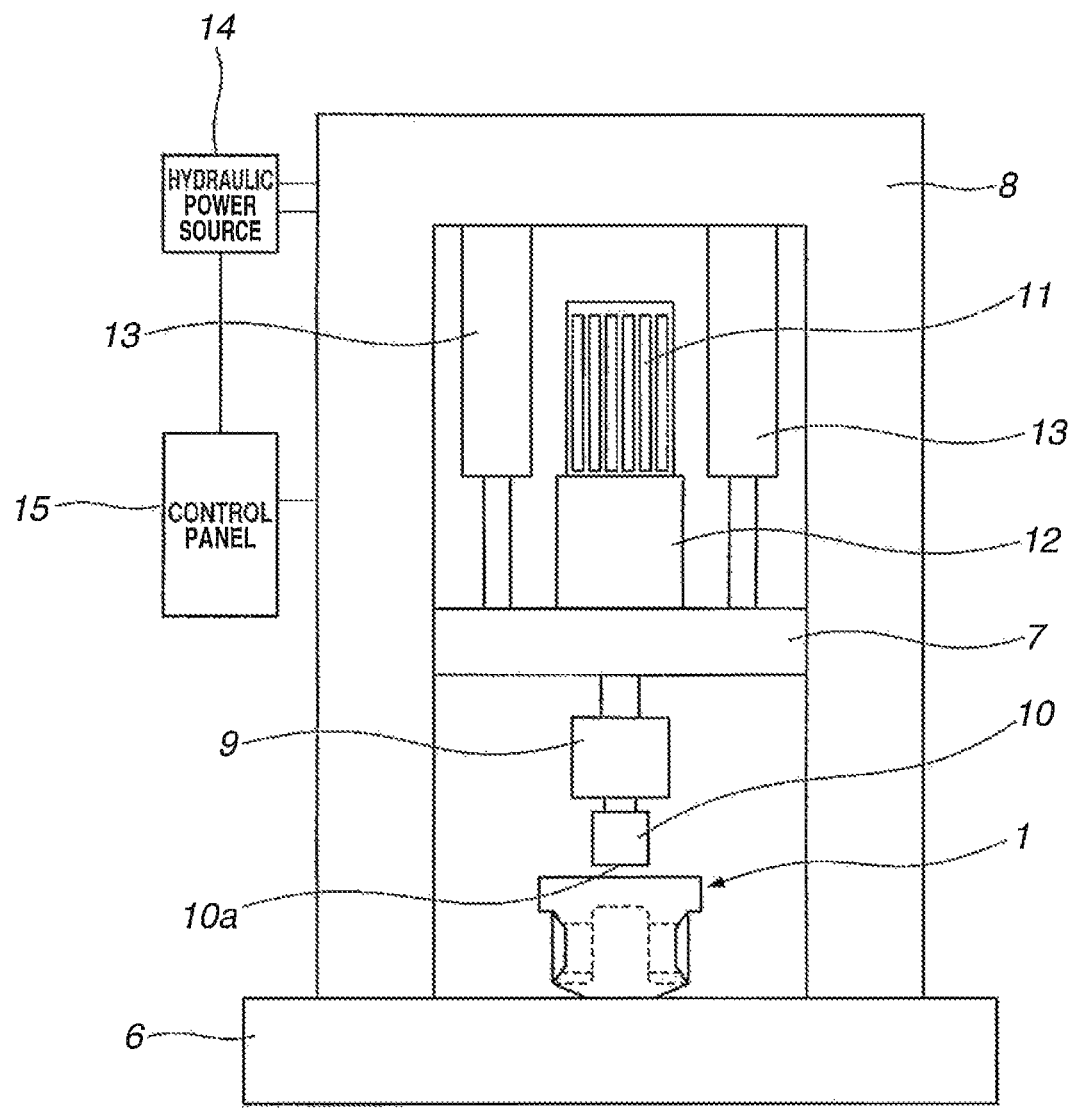
FIG. 3 is a view explaining the outline of a friction bonding machine as served in friction bonding and shown in FIG. 2.

FIG. 3 schematically shows the structure of the friction bonding machine for performing friction bonding. It will be understood that this friction bonding machine applies conventionally known facilities for friction stir welding, in which piston 1 serving as a workpiece is to be positioned on bed 6 and crosshead 7 opposed to the bed 6 is vertically movably supported by arch-like frame 8. Crosshead 7 is equipped with a solid cylindrical rotary implement (tool or probe) 10 for friction bonding, through tool holder 9 and on the downward side. This rotary implement 10 is rotationally driven by motor 11 mounted on crosshead 7 through gearbox 12. Simultaneously, the whole of crosshead 7 including rotary implement 10 is to be vertically driven by hydraulic cylinder 13. Incidentally, as has been conventionally known, the friction bonding machine is also provided with control panel 15, in addition to hydraulic power source 14.

By the way, end surface 10a of rotary implement 10 is provided to serve as a circular flat surface having a diameter slightly larger than that of concave part 5 of FIG. 1. Though rotary implements used for conventionally known friction stir welding have been conditioned by having at the flat surface a projecting part for stirring operation, such a projecting part is not provided in the friction bonding of the present embodiment because stirring operation is not required. Hence end surface 10a of rotary implement 10 is shaped into merely a circular flat surface.

Figure 4A:
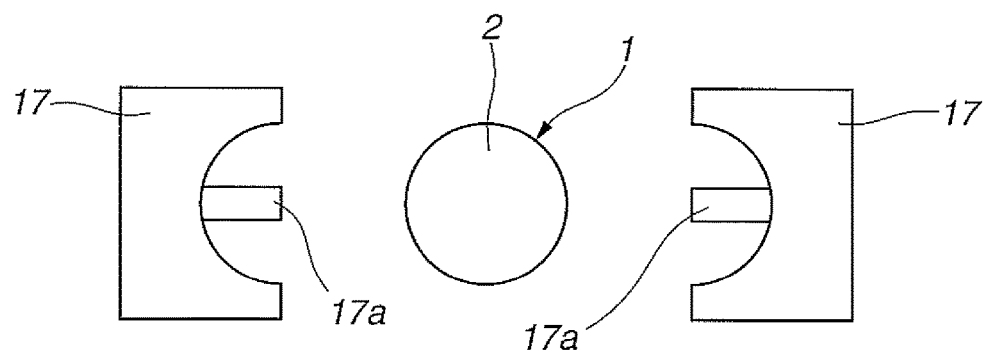
Figure 4B:
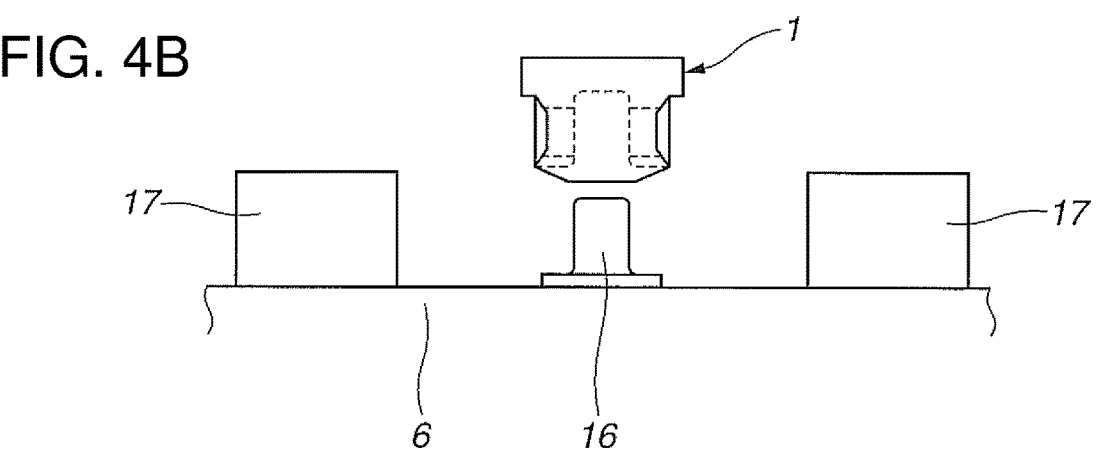

FIG. 4 illustrates the details of a mechanism that governs the operation of positioning piston 1 on bed 6 in the friction bonding machine as shown in FIG. 3, in which (A) is an explanatory front view while (B) is an explanatory plan view of the figure (A). As shown in (A) and (B) of FIG. 4, at the time of positioning and clamping piston 1 on bed 6 of FIG. 3, piston 1 is attached to center jig 16 mounted on bed 6, so that their projection and depression are fitted to support crown surface 2 from the inside. Additionally, a half-shaped right and left pair of side jigs 17 each of which has prominent section 17a insertable into a pinhole of the side of piston 1 is moved in the forward direction by a hydraulic cylinder (though not shown) so as to restrain piston 1 with pressure from both sides, thereby accomplishing positioning and clamping. In view of preventing piston 1 from deformation, it is preferable to support crown surface 2 by total contact than support it from the inside.

In this state of things, rotary implement 10 is brought into contact with concave part 5 of piston 1 charged with the mixed powder, at end surface 10a while being rotated, in such a manner as to substantially cover concave part 5 so that the mixed powder is not spilled therefrom. It is for this reason that the circular flat end surface 10a of rotary implement 10 is formed slightly larger than the shape of concave part 5 as mentioned above. Incidentally, unless end surface 10a of rotary implement 10 moves out of concave part 5, rotary implement 10 may be in such a rotational form that even its axis is moved in itself.

Moreover, a load is applied to rotary implement 10 during its rotation in order to press it more tightly. The load is removed when reaching a specified load, pushing amount and friction torque, followed by pulling rotary implement 10 up and stopping its rotation. Incidentally, the pushing amount of rotary implement 10 is an amount required to generally equalize the volume of concave part 5 with the volume of the mixed powder, which means nothing else that the voidage of the mixed powder approaches zero as close as possible With this operation, the apparent density of the mixed powder is so increased as to come closer to the absolute density, and additionally the frictional heat is generated among rotary implement 10, concave part 5 on the side of piston 1 and the mixed powder to soften concave part 5 and the mixed powder, not so much as to melt them. Then, the mixed powder causes stir binding among themselves, while causing stir binding also against concave part 5 (serving as the base material of piston 1) to be bound in a solid phase thereto. Low thermal conductive part 4 as shown in FIG. 1 is thus formed.

FIG. 5 is a detail illustration showing a process of the above-mentioned friction bonding. (A) of FIG. 5 shows a state of concave part 5 being filled with mixed powder P but not in contact with rotary implement 10, while (B) of FIG. 5 shows a state of rotary implement 10 being in contact with the periphery of concave part 5. Furthermore, (C) of FIG. 5 shows a state where rotary implement 10 is pressed against concave part 5 up to a certain amount so that low thermal conductive part 4 is formed.

As rotary implement 10 gets pressed as shown in the figure (C), the shape of the end of rotary implement 10 is transferred to the periphery of low thermal conductive part 4 thereby forming another concave part 18 having a diameter slightly larger than that of the previously formed concave part 5. Concurrently, there is formed "burr" F at the periphery of low thermal conductive part 4 since the base material of piston 1 is pushed off as rotary implement 10 is getting pressed. However, the "burr" F is to be removed by cutting through the secondary machining as shown in FIG. 2. More specifically, in the secondary machining as shown in FIG. 2, cutting is to be performed so that the surface of low thermal conductive part 4 becomes flush with the base material of piston 1 in order to eliminate the concave part 18 newly formed by pressing rotary implement 10, at which time the "burr" F is to be cut off.

The diameter of concave part 5 and the diameter of rotary implement 10 are required only to be in such a relationship that the diameter of rotary implement 10 is larger than the diameter of concave part 5. It is more preferable that the diameter of rotary implement 10 is around 1 mm larger than the diameter of concave part 5. Additionally, the shape of concave part 5 is not necessarily circular and it is preferable if rotary implement 10 has a circular shape the concave part 5 also has a circular shape.

Referring now to Examples as follows, the first embodiment of the friction bonding will be discussed in detail.

EXAMPLES

A test sample (4032-T6) of a base material formed of an aluminum alloy was provided to have concave part 5 measuring 33 mm in diameter and 5 mm in depth. Then, concave part 5 was fully charged with a mixed powder containing: 73 wt % of stabilized zirconia powder serving as a filler material and having a particle diameter of 30 μm; and 27 wt % of pure aluminum powder serving as a bonding material and having a particle diameter of 30 μm. Rotary implement 10 formed of tool steel and having a diameter of 34 mm was rotated at 800 rpm and pushed against the test sample under load during the rotation. When the rotary implement was pushed to a depth of about 2.9 mm, pushing of rotary implement 10 was terminated. The conditions in this case are enumerated below.

Material of rotary implement 10: SKD61
The number of rotations of rotary implement 10: 800 rpm
Diameter of rotary implement 10: φ34 mm
Pushing speed of rotary implement 10: 20 min/min
Diameter of concave part 5: φ33 mm
Mixed powder: A mixed powder of zirconia powder serving as a filler material and pure aluminum powder serving as a bonding material (73 wt % of zirconia powder and 27 wt % of pure aluminum powder)

Figure 7:
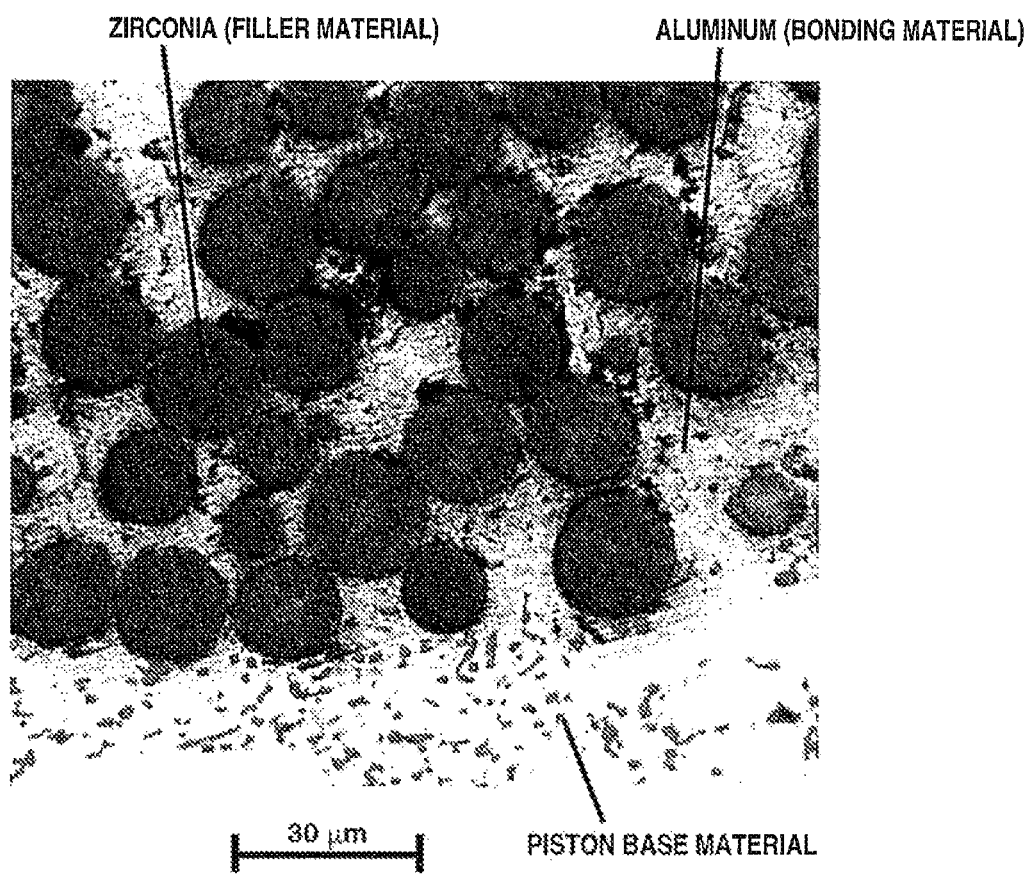
FIG. 7 is a microscope photograph of the texture of region A of FIG. 6.

FIG. 6 is a cross-sectional view of the test sample used in the first embodiment of the friction bonding, and FIG. 7 is an enlarged view of a region "A" of FIG. 6, i.e., an enlarged view of the texture of a borderland between the base material and the newly formed low thermal conductive part 4. As is evident from FIG. 6, it can be confirmed that low thermal conductive part 4 was formed at the bottom side of concave part 18 provided by pressing rotary implement 10, in such a manner to be fitted in the previously formed concave part 5. Additionally, as is evident from FIG. 7, it can be confirmed that pure aluminum contained in the mixed powder in low thermal conductive part 4 as the bonding material was sufficiently welded to the base material and it can be observed that zirconia contained in low thermal conductive part 4 as the filler material was dispersed mostly homogenously. The bonding strength of low thermal conductive part 4 to the base material of piston 1 is thus improved and therefore contributes to the enhancement of bonding quality and reliability.

Figure 8A:
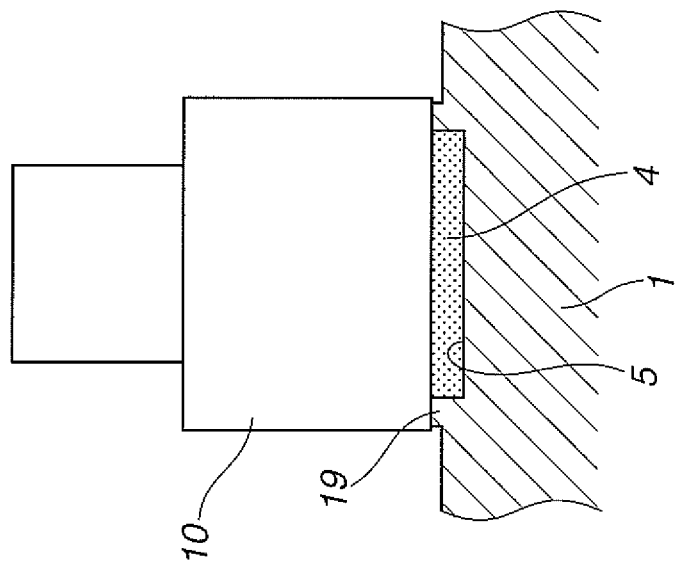
FIGS. 8A and 8B are a view showing a second embodiment of the present invention, or a process-explaining view showing the details of a friction bonding step.
Figure 8B:
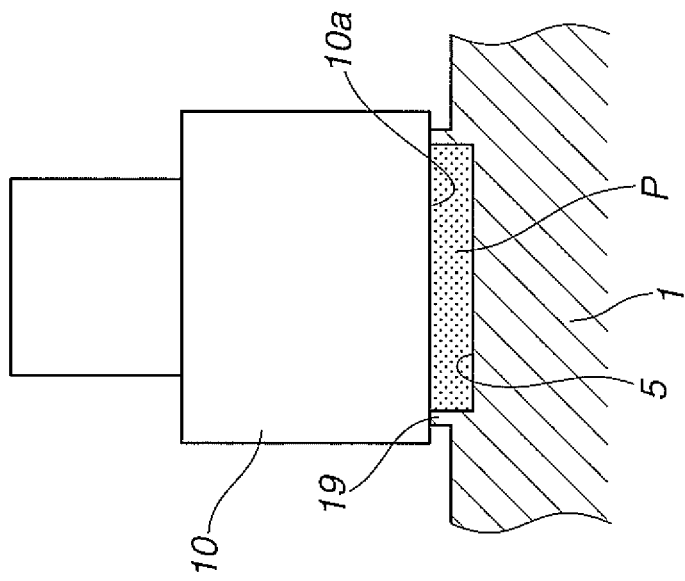

FIG. 8 shows a second embodiment for carrying out the present invention. In the second embodiment, an annular rib 19 for enclosing the concave part 5 was previously formed at the periphery of concave part 5. At the time of friction bonding, rotary implement 10 was pressed against the base material of piston 1 to collapse the rib 19. Other machining conditions were much the same as those in the above-mentioned first embodiment.

In the first embodiment as shown in FIG. 5, the formation of additional concave part 18, caused by pushing rotary implement 10 in order to attain friction bonding was inevitable; therefore, it was necessary to perform cutting as a post-treatment for eliminating the concave part 18 or for making the surface of low thermal conductive part 4 flush with the base material of piston 1, which resulted in a waste of material.

On the contrary, the second embodiment as shown in FIG. 8 was carried out by collapsing the previously formed rib 19 at the periphery of concave part 5, so that the amount of cutting was saved when performing cutting to make the surface of low thermal conductive part 4 flush with the base material of piston 1, which brought about the advantage of improvement in material yield.

Figure 9:
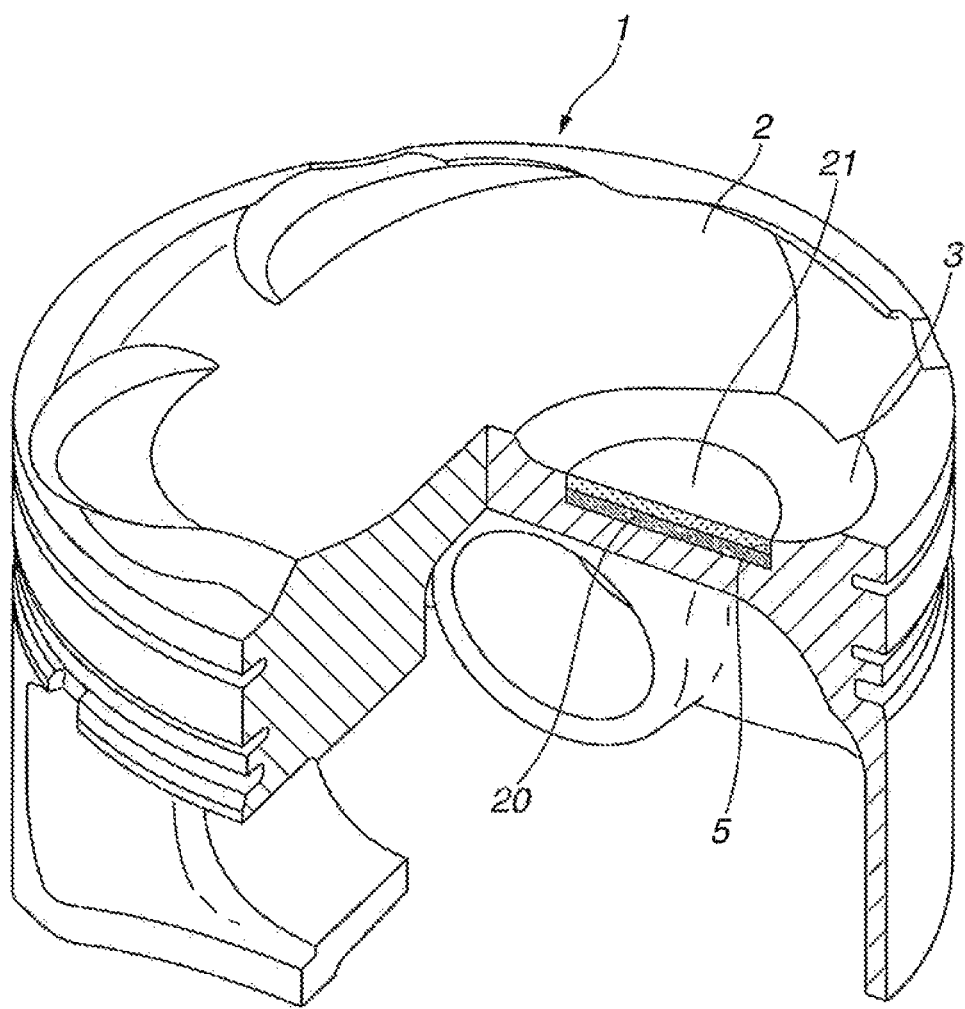
FIG. 9 is a view showing another example of a piston manufactured according to the present invention, or a view explaining a structure with part broken.

FIG. 9 is a view showing a third embodiment for carrying out the present invention, in which members common with FIG. 1 are given the same reference numeral. As shown in FIG. 9, piston 1 of the third embodiment adopted a two-layer structure constituted of low thermal conductive part 20 that functions as a lower insulating layer and high thermal conductive part 21 that functioned as an upper layer having a thermal conductivity higher than that of low thermal conductive part 20, instead of low thermal conductive part 4 of FIG. 1. Low thermal conductive part 20 behaving as the lower layer aimed at insulation, while high thermal conductive part 21 behaving as the upper layer was provided to have a thermal capacity enough to receive heat from flames and rapidly increase in temperature and vaporize the fuel. By substantially providing the lower layer and the upper layer, a function-sharing was proposed.

Figure 10A:
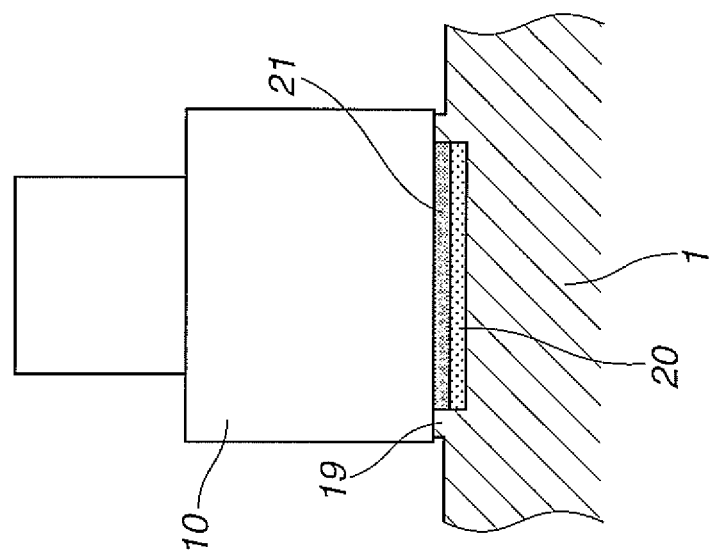
FIGS. 10A and 10B are a view showing a third embodiment of the present invention, or a process-explaining view showing the details of the friction bonding step.
Figure 10B:
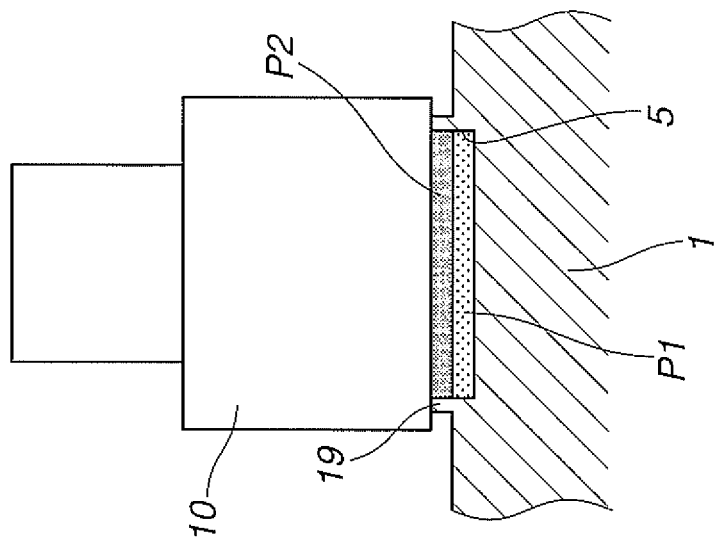

As long as the insulating effect of low thermal conductive part 20 (as the lower layer) is efficiently exhibited, high thermal conductive part 21 (as the upper layer) is required only to have an area and thickness giving a suitable specific heat and weight. A concrete example is shown by FIG. 10. In FIG. 10, members common with FIG. 8 are given the same reference numeral.

As shown in (A) of FIG. 10, mixed powder P1 was prepared as a mixed powder for low thermal conductive part 20 (or the lower layer) and then charged into concave part 5 and tamped, the mixed powder P1 containing 83 wt % of borosilicate glass powder serving as a filler material and having a particle diameter of 4 μm and 17 wt % of pure aluminum powder serving as a bonding material and having a particle diameter of 30 μm. Incidentally, this step corresponds to a lower layer-filling step. After compacting mixed powder P1 (the lower layer), a certain amount of pure aluminum powder P2 prepared as a powder for high thermal conductive part 21 (the upper layer) was loaded onto the lower layer, the powder P2 serving as a bonding material and having a particle diameter of 30 μm. Incidentally, this step corresponds to an upper layer-filling step. Thereafter, as shown in the figure (B), friction bonding was performed by using rotary implement 10 in a manner similar to FIG. 8. Conditions for this friction bonding were much the same as those in the above-mentioned first embodiment.

In this case, pure aluminum powder serving as a bonding material was contained in both of the lower and upper layers. Therefore, there was no obvious boundary between low thermal conductive part 20 (the lower layer) and high thermal conductive part 21 (the upper layer) and it was confirmed that the pure aluminum layer serving as high thermal conductive part (upper layer) 21 was bound to the base material of piston 1 by stir welding so as to be generally equal to wrought aluminum material in density. Moreover, low thermal conductive part (lower layer) 20 was confirmed to hold the borosilicate glass powder, though smaller than high thermal conductive part (upper layer) 21 in amount of aluminum. Additionally, low thermal conductive part (lower layer) 20 was confirmed to sufficiently be welded to the base material of piston 1 while having a slight voidage. With this, the same effects as in the first embodiment were obtained.

FIG. 11 shows a fourth embodiment for carrying out the present invention. On the contrary to the above-mentioned third embodiment where mixed powders charged separately into two layers consisting of an upper layer and a lower layer were bonded by one friction bonding using rotary implement 10, the fourth embodiment as shown in FIG. 11 was performed such that the lower layer and the upper layer were independently subjected to friction bonding using rotary implement 10.

In the fourth embodiment, as shown in (A) of FIG. 11, mixed powder P1 was prepared as a mixed powder for low thermal conductive part 20 (or the lower layer) and then charged into concave part 5 and tamped in a manner similar to (A) of FIG. 10, the mixed powder P1 containing 83 wt % of borosilicate glass powder serving as a filler material and having a particle diameter of 4 μm and 17 wt % of pure aluminum powder serving as a bonding material and having a particle diameter of 30 μm. Incidentally, this step corresponds to a first material-filling step. After compacting mixed powder P1 (the lower layer), friction bonding was performed by using rotary implement 10 a shown in the figure (B). This step corresponds to a primary friction bonding step.

In this case, annular rib 22 previously formed at the periphery of concave part 5 was not collapsed as a whole, and more specifically, a part of the outer periphery of the rib 22 was left without being collapsed. With this, as shown in FIG. 9 and (B) and (C) of FIG. 11, low thermal conductive part 20 serving as the lower layer was formed by priority in concave part 5.

Subsequently, as shown in (D) of FIG. 11, a certain amount of pure aluminum powder P2 prepared as a powder for high thermal conductive part 21 (the upper layer) was loaded onto the low thermal conductive part 20, the powder P2 serving as a bonding material and having a particle diameter of 30 μm. Incidentally, this step corresponds to a second material-filling step. In use of rotary implement 23 having a diameter larger than that of the previously used rotary implement 10, friction bonding was conducted while collapsing the remaining rib 22. Incidentally, this step corresponds to a secondary friction bonding step. Conditions for the primary and secondary friction bonding steps were much the same as those in the above-mentioned first embodiment. With this, as shown in FIG. 9 and (E) of FIG. 11, high thermal conductive part 21 (or the upper layer) was formed on low thermal conductive part 20 (or the lower layer) in a manner similar to the third embodiment.

The fourth embodiment was distinct from the above-mentioned third embodiment in that the friction bonding was completed in one step or separated into two steps, but these are equal in that high thermal conductive part 21 (or the upper layer) was formed superimposed on low thermal conductive part 20 (or the lower layer).

Also in the fourth embodiment, pure aluminum powder serving as a bonding material was contained in both of the lower and upper layers. Therefore, there was no obvious boundary between low thermal conductive part 20 (the lower layer) and high thermal conductive part 21 (the upper layer) and it was confirmed that the pure aluminum layer serving as high thermal conductive part (upper layer) 21 was bound to the base material of piston 1 by stir welding so as to be generally equal to wrought aluminum material in density. Moreover, low thermal conductive part (lower layer) 20 held the borosilicate glass powder and confirmed to sufficiently be welded to the base material of piston 1, though smaller than high thermal conductive part (upper layer) 21 in amount of aluminum. With this, the same effects as in the first embodiment were obtained.

In the third and fourth embodiments basically comprising the two-layer structure constituted of low thermal conductive part 20 (as the lower layer) and high thermal conductive part 21 (as the upper layer), ribs 19, 22 previously formed at the periphery of concave part 5 are not necessarily required, so that the two-layer structure is feasible even if ribs 19, 22 are not formed. Similarly, material of high thermal conductive part 21 (the upper layer) is required only to be metal which may form an alloy or an intermetallic compound as a bonding material when blending with the base material (formed of aluminum alloy) of piston 1. Accordingly, it is possible to employ powder of iron, copper, nickel, manganese, zinc, chromium or the like instead of the pure aluminum powder used in the above-mentioned third and fourth embodiments. Furthermore, it is also possible to use a wrought material or plate-shaped material of aluminum, iron, copper, nickel, manganese, zinc, chromium or the like as it is, instead of powdery material.

Now there will be discussed low thermal conductive part 4 or 20 formed by friction bonding and functions as an insulating layer throughout the first to fourth embodiments, the basic principle of which is to compressively deform a powder such as a mixed powder while softening it by frictional heat and to simultaneously bond particles under pressure to each other to attain stir welding. In this case, air is to get caught in the interior concurrently but slightly; therefore a part of the air is dispersed in particles of powder thereby wearing oxide by oxidation but another part is encapsulated in the layer while keeping its compressed state.

If assuming that heat treatment such as solution aging treatment is conducted as a post-treatment on piston 1 having been formed with low thermal conductive part 4 or 20 as shown in FIG. 2, there never causes a secondary malfunction such as bubbles due to air encapsulated in the interior. The reason therefor is that a treatment for friction bonding is performed under a condition provided with temperature and pressure equal to those in the solution agent treatment. However, air is to oxidize the surface of particles of powder at the time of friction bonding and may become a factor for inhibiting particles from excellently bonding to each other under pressure by stir welding, so that it is preferable to eliminate air if possible.

FIG. 12 shows a fifth embodiment for carrying out the present invention, in which the elimination of air at the time of friction bonding was taken into consideration. Incidentally, members common with FIG. 8 are given the same reference numeral.

As shown in FIG. 12, a stepped cylindrical rotary implement 24 was provided to have a complex structure constituted of outer cylindrical section 24a and inner cylindrical section 24b (solid, and serving as a shaft center), which were axially movable relative to each other. Moreover, outer cylindrical section 24a is formed with vacuuming passage 25 having port section 25a at one end and connected at the other end to a vacuum pump or a different negative pressure suction source (though not shown), the port section 25a opening toward inner peripheral surface defined by the bottom part of outer cylindrical section 24a.

In friction bonding, concave part 5 enclosed by annular rib 19 was charged with mixed powder P as used in FIG. 8 as shown in (A) of FIG. 12, and then rotary implement 24 was pressed against concave 5 to seal it. Immediately before starting friction bonding, inner cylindrical section 24b was moved upward relative to outer cylindrical section 24a to a certain extent. Then vacuuming was initiated in a state of port section 25a opening, thereby aspirating air contained in concave part 5 or in mixed powder P.

For example, when air suction reached 1 mmHg or below, inner cylindrical section 24b was moved downward until its bottom surface got flush with the bottom surface of outer cylindrical section 24a as shown in the figure (B), thereby closing port section 25a of vacuuming passage 25. Thereafter outer cylindrical section 24a and inner cylindrical section 24b are integrally pushed (in other words, rotary implement 24 as a whole was pushed) while being rotated, thereby forming low thermal conductive part 4 in the same manner as to FIG. 8.

According to the fifth embodiment, the friction bonding is the same as in the above-mentioned embodiments but it is the so-called vacuum stir welding. Hence the bonding strength between particles constituting low thermal conductive part 4 is dramatically improved. As a result, the bonding strength of low thermal conductive part 4 to the base material of piston 1 is also enhanced so that the bonding quality and the reliability are further improved.

The invention claimed is:

1. A method for manufacturing a piston for internal combustion engine, the method for manufacturing a piston for internal combustion engine comprising:
a concave part-forming step for forming a concave part in a crown surface of the piston, the crown surface defining a combustion chamber;
a material-filling step for filling the concave part with a mixed powder or a compacted body of the mixed powder, the mixed powder being obtained by mixing a powder of a filler material smaller than a base material of the piston in thermal conductivity and a powder of a bonding material which may become an alloy or an intermetallic compound when blending with the base material; and
a friction bonding step of bringing a rotary implement into contact with a region of the concave part involving the mixed powder or the compacted body of the mixed powder and then softening the mixed powder or the compacted body of the mixed powder by frictional heat, thereby bonding the mixed powder or the compacted body of the mixed powder to the concave part in a solid phase to form a low thermal conductive part.

2. A method for manufacturing a piston for internal combustion engine, as claimed in claim 1, wherein in the friction bonding step the frictional heat is generated by pressing the rotary implement against the base material while covering the whole range of the concave part with an end surface of the rotary implement.

3. A method for manufacturing a piston for internal combustion engine, as claimed in claim 2, wherein the concave part formed in the crown surface is located at a position where fuel injected from a fuel injection valve impinges.

4. A method for manufacturing a piston for internal combustion engine, as claimed in claim 2, wherein the end surface of the rotary implement is shaped into a circular flat surface.

5. A method for manufacturing a piston for internal combustion engine, as claimed in claim 1, wherein the filler material contains at least one of zirconia, cordierite, mullite, silicon, silica, mica, talc silicate glass, acrylic glass, organic glass, silica aerogel, hollow ceramic beads, hollow glass beads and hollow metal balls, organic silicon compound, ceramic fiber, titanium alloy, low-alloy steel and cast iron.

6. A method for manufacturing a piston for internal combustion engine, as claimed in claim 1, wherein the compacted body of the mixed powder is a green compact obtained by compacting the mixed powder.

7. A method for manufacturing a piston for internal combustion engine, as claimed in claim 1, wherein a rib is previously formed at the periphery of the concave part and that in the friction bonding step the frictional heat is generated by pressing the rotary implement against the base material while covering the whole range of the concave part including the rib with an end surface of the rotary implement.

8. A method for manufacturing a piston for internal combustion engine, as claimed in claim 1, further comprising a step of vacuuming air from the concave part, prior to a treatment for the friction bonding step.

9. A method for manufacturing a piston for internal combustion engine, as claimed in claim 1, wherein heat treatment is performed after a treatment for the friction bonding step.

10. A method for manufacturing a piston for internal combustion engine, as claimed in claim 9, wherein the heat treatment is a solution aging treatment or artificial aging treatment.

11. A method for manufacturing a piston for internal combustion engine, the method for manufacturing a piston for internal combustion engine comprising:
- a concave part-forming step for forming a concave part in a crown surface of the piston, the crown surface defining a combustion chamber;
- a lower layer-filling step for filling the concave part with a mixed powder or a compacted body of the mixed powder, the mixed powder being obtained by mixing a powder of a filler material smaller than a base material of the piston in thermal conductivity and a powder of a bonding material which may become an alloy or an intermetallic compound when blending with the base material;
- an upper layer-filling step where a high thermal conductive material having a thermal conductivity higher than that of the mixed powder or the compacted body of the mixed powder that is to become a lower layer which high thermal conductive material may become an alloy or an intermetallic compound when blending with the base material or a powder of the high thermal conductive material or a compacted body of the powder is loaded on the lower layer; and
- a friction bonding step of bringing a rotary implement into contact with a region of the concave part involving the high thermal conductive material or the powder of the high thermal conductive material or the compacted body of the powder that is to become an upper layer and then softening the high thermal conductive material or the powder of the high thermal conductive material or the compacted body of the powder by frictional heat, thereby bonding the high thermal conductive material or the powder of the high thermal conductive material or the compacted body of the powder to the concave part in a solid phase to form a high thermal conductive part.

12. A method for manufacturing a piston for internal combustion engine, the method for manufacturing a piston for internal combustion engine comprising:
- a concave part-forming step for forming a concave part in a crown surface of the piston, the crown surface defining a combustion chamber;
- a first material-filling step where a powder of a filler material smaller than a base material of the piston in thermal conductivity or a compacted body of the powder, and a powder of a bonding material which may become an alloy or an intermetallic compound when blending with the base material or a compacted body of the powder are charged into the concave part;
- a primary friction bonding step of bringing a rotary implement into contact with a region of the concave part involving the powder or compact body of the both materials and then softening the powder or compact body of the both materials by frictional heat, thereby bonding the powder or compact body of the both materials to the concave part in a solid phase to form a low thermal conductive part;
- a second material-filling step where a high thermal conductive material which is higher than the low thermal conductive part in thermal conductivity and may become an alloy or an intermetallic compound when blending with the base material, or a powder of the high thermal conductive material or a compacted body of the powder is loaded on the low thermal conductive part; and
- a secondary friction bonding step of bringing a rotary implement into contact with the high thermal conductive material or the powder of the high thermal conductive material or the compacted body of the powder and then softening the high thermal conductive material or the powder of the high thermal conductive material or the compacted body of the powder by frictional heat, thereby bonding the high thermal conductive material or the powder of the high thermal conductive material or the compacted body of the powder to the base material and the low thermal conductive part in a solid phase to form a high thermal conductive part.

13. A method for manufacturing a piston for internal combustion engine, as claimed in claim 12, wherein:
- in the primary friction bonding step, the frictional heat is generated by pressing the rotary implement against the base material while covering the whole range of the concave part with an end surface of the rotary implement;
- in the secondary friction bonding step, the frictional heat is generated by pressing the rotary implement against the base material while covering the whole range of the concave part with an end surface of the rotary implement, the concave part having been subjected to formation through the primary friction bonding step; and
- the rotary implement used in the secondary friction bonding step is larger than the rotary implement used in the primary friction bonding step in area of the end surface.

14. A method for manufacturing a piston for internal combustion engine, as claimed in claim 13, wherein:
- a rib is previously formed at the periphery of the concave part;
- in the primary friction bonding step, the rotary implement is pressed against the base material while covering the whole range of the concave part with the end surface of the rotary implement, the concave part involving a part of the rib; and
- in the secondary friction bonding step, the rotary implement is pressed against the base material while covering the whole range of the concave part with the end surface of the rotary implement, the concave part involving the remaining rib and having been subjected to formation through the primary friction bonding step.

* * * * *